United States Patent
Chen et al.

(10) Patent No.: US 9,477,431 B1
(45) Date of Patent: Oct. 25, 2016

(54) MANAGING STORAGE SPACE OF STORAGE TIERS

(71) Applicant: EMC Corporation, Hopkinton, MA (US)

(72) Inventors: Xiangping Chen, Sherborn, MA (US); Dennis T Duprey, Raleigh, NC (US); Qin Tao, Hopkinton, MA (US); Mark K Ku, Wollaston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 155 days.

(21) Appl. No.: 13/730,635

(22) Filed: Dec. 28, 2012

(51) Int. Cl.
*G06F 12/00* (2006.01)
*G06F 3/06* (2006.01)
*G06F 12/02* (2006.01)

(52) U.S. Cl.
CPC ............. *G06F 3/0689* (2013.01); *G06F 12/02* (2013.01); *G06F 12/023* (2013.01); *G06F 2212/70* (2013.01)

(58) Field of Classification Search
CPC .... G06F 12/02; G06F 12/023; G06F 3/0689; G06F 2212/70
See application file for complete search history.

(56) References Cited

U.S. PATENT DOCUMENTS

| | | | |
|---|---|---|---|
| 7,467,291 B1* | 12/2008 | Cockroft et al. ................. 713/1 |
| 7,480,912 B2* | 1/2009 | Arnold .................. G06F 9/5016 711/111 |
| 7,539,709 B1* | 5/2009 | Vengerov .......... G06F 17/30067 |
| 7,606,934 B1* | 10/2009 | Vengerov ............... G06F 3/0611 706/21 |
| 8,006,061 B1* | 8/2011 | Chatterjee et al. ........... 711/170 |
| 8,443,163 B1 | 5/2013 | Bailey |
| 8,473,678 B1 | 6/2013 | Rajasekaran |
| 2006/0112247 A1* | 5/2006 | Ramany ................ G06F 3/0605 711/165 |
| 2009/0276588 A1* | 11/2009 | Murase ......................... 711/160 |
| 2010/0070978 A1* | 3/2010 | Chawla ................ G06F 9/5077 718/105 |
| 2011/0010514 A1* | 1/2011 | Benhase ................. G06F 3/061 711/162 |

\* cited by examiner

*Primary Examiner* — David X Yi
*Assistant Examiner* — Francisco Grullon
(74) *Attorney, Agent, or Firm* — Krishnendu Gupta; Jason A. Reyes; Deepika Bhayana

(57) ABSTRACT

A method is used in managing storage space of storage tiers. Storage space utilization characteristics of a storage tier of a set of storage tiers in a storage system are evaluated. Based on the evaluation, reservation of headroom storage space in the storage tier is adjusted. The headroom storage space indicates an amount of the storage space reserved as unused storage space in the storage tier.

14 Claims, 10 Drawing Sheets

MANAGING STORAGE SPACE OF STORAGE TIERS

BACKGROUND

1. Technical Field

This application relates to managing storage space of storage tiers.

2. Description of Related Art

A traditional storage array (herein also referred to as a "data storage system", "disk storage array", "disk array", or simply "array") is a collection of hard disk drives operating together logically as a unified storage device. Storage arrays are designed to store large quantities of data. Storage arrays typically include one or more storage array processors (SPs), for handling requests for allocation and input/output (I/O) requests. An SP is the controller for and primary interface to the storage array.

A storage array may be thought of as a system for managing a large amount of a resource, i.e., a large number of disk drives. Management of the resource may include allocation of a portion of the resource in response to allocation requests. In the storage array example, portions of the storage array may be allocated to, i.e., exclusively used by, entities that request such allocation.

The administrator of a storage array may desire to operate the array in a manner that maximizes throughput and minimizes response time. In general, performance of a storage array may be constrained by both physical and temporal constraints. Examples of physical constraints include bus occupancy and availability, excessive disk arm movement, and uneven distribution of load across disks. Examples of temporal constraints include bus bandwidth, bus speed, spindle rotational speed, serial versus parallel access to multiple read/write heads, and the size of data transfer buffers.

Large storage arrays today manage many disks that are not identical. Storage arrays use different types of disks and group the like kinds of disks into tiers based on the performance characteristics of the disks. A group of fast but small disks may be a fast tier (also referred to as "higher tier" or "high tier"). A group of slow but large disks may be a slow tier (also referred to as "lower tier" or "low tier"). It may be possible to have different tiers with different properties or constructed from a mix of different types of physical disks to achieve a performance or price goal. Storing often referenced, or hot, data on the fast tier and less often referenced, or cold, data on the slow tier may create a more favorable customer cost profile than storing all data on a single kind of disk.

A storage tier may be made up of different types of disks, i.e., disks with different redundant array of inexpensive disks (RAID) levels, performance and cost characteristics. In the industry there have become defined several levels of RAID systems. RAID (Redundant Array of Independent or Inexpensive Disks) parity schemes may be utilized to provide error detection during the transfer and retrieval of data across a storage system.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. For example, a traditional storage array may include a collection of hard disk drives operating together logically as a unified storage device. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

SUMMARY OF THE INVENTION

A method is used in managing storage space of storage tiers. Storage space utilization characteristics of a storage tier of a set of storage tiers in a storage system are evaluated. Based on the evaluation, reservation of headroom storage space in the storage tier is adjusted. The headroom storage space indicates an amount of the storage space reserved as unused storage space in the storage tier.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
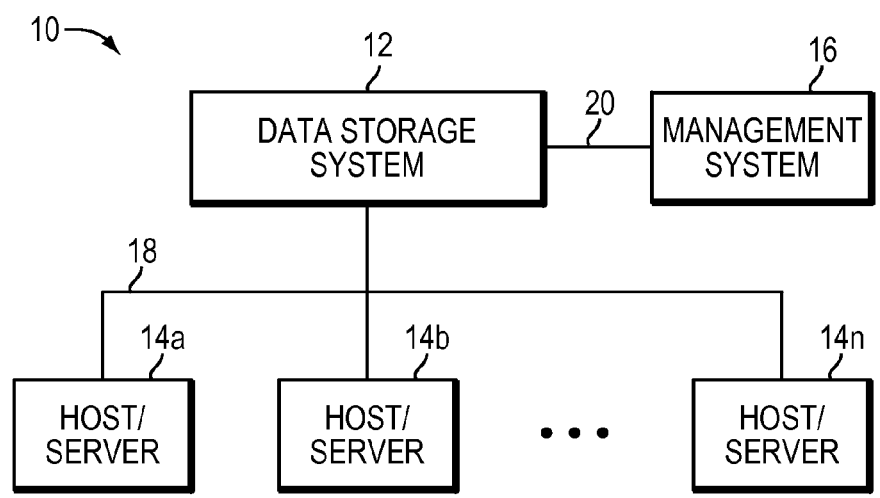
FIG. 1 is an example of an embodiment of a computer system that may utilize the techniques described herein.

Described below is a technique for use in managing storage space of storage tiers, which technique may be used to provide, among other things, evaluating storage space utilization characteristics of a storage tier of a set of storage tiers in a storage system, and based on the evaluation, adjusting reservation of headroom storage space in the storage tier, where the headroom storage space indicates an amount of the storage space reserved as unused storage space in the storage tier.

Generally, a storage pool is a collection of storage that is provisioned for a logical unit. A storage pool may be a collection of disks, which may include disks of different types. Storage pools may further be subdivided into slices; for example a 1 gigabyte (GB) slice may be the allocation element for a logical unit. Further, a slice may be 256 megabytes (MB) in size. A pool may include a set of storage tiers. Further, both a storage tier and a pool may have storage devices of different performance capabilities and costs. A slice may be considered the smallest element that can be tracked and moved. It may be advantageous to store the hot or most accessed data on the devices within the storage pool with the best performance characteristics while storing the cold or least accessed data on the devices that have slower performance characteristics. This can lead to a lower cost system having both faster and slower devices that can emulate the performance of a more expensive system having only faster storage devices.

A storage tier or a storage pool may be a collection of storage containers. A storage container may be a unit of storage including a set of storage extents. A storage extent is a logical contiguous area of storage reserved for a user requesting the storage space. For example, a storage tier may include three storage containers, each storage container including a set of disks and the set of disk in each storage container having different RAID levels.

A disk may be a physical disk within the storage system. A LUN may be a logical unit number which is an identifier for a Logical Unit. Each slice of data may have a mapping to the location of the physical drive where it starts and ends.

Generally, slices are allocated to LUNs in a storage pool as "best-fit" at initial allocation time. In at least some cases, since the I/O load pattern of a slice is not known at initial allocation time, the performance capability of storage allocated may be too high or too low for effective data access on a slice. Furthermore, a data access pattern tends to change over time. Older data is accessed less frequently and therefore in at least many cases does not require storage with higher performance capability. Temperature of each storage slice is an indication of hotness of a slice, in other words, frequency and recency of slice I/Os. Better overall system performance can be achieved by placing hot slices to higher tier and cold slices to lower tier.

Slice relocation (herein also referred to as a "data relocation" or "data migration") is a process of determining optimal or near optimal data placement among storage objects (e.g., storage tier, RAID group) based on I/O load of the storage objects. Slice relocation helps provide a way to determine respective preferable or best storage locations of slices within a LUN in a storage pool, and to construct a slice relocation candidate list to move slices from their current locations to the respective preferable or best locations. Data migration, i.e., the moving of data from one storage element to another, may be performed at the LUN level or at the slice level. Data migration at the slice level may be performed by copying the data of a slice and then updating an address map of the slice with the new location of the slice. A slice may store data or metadata of the data. I/O operations performed for copying data of a slice in order to relocate the slice are referred to as relocation I/Os. Generally, in order to perform data migration for a storage object such as a slice, the slice is mirrored in such a way that two copies of the slices are maintained during relocation of the slice where a source copy refers to the original slice which is targeted for relocation and a destination copy refers to a destination slice to which data of the original slice is copied to. Thus, the slice relocation process requires storage space in a destination storage tier for relocating contents of source slices and requires swap storage space in a source storage tier for mirroring the source slices to destination slices.

Generally, an Auto-Tiering policy engine (PE) of a data storage system examines a storage pool's storage configuration and temperatures of all slices in that storage pool, and generates a slice relocation list. The slice relocation list identifies slices to be relocated with respective destination information. In general, slices in a storage pool are matched to the most appropriate respective tiers based on their respective temperatures (e.g., hot, cold) and tier preferences (e.g., High, Low, Optimal). If a slice's current tier differs from its matching tier, the slice is listed in the relocation candidate list. The PE is also referred to herein as the slice relocation process.

Further, a tiered storage pool may include storage with different performance characteristics such that a logical unit created from storage space provisioned from the storage pool may include slices from different storage tiers with different performance characteristics. An automated storage tiering process (also referred to herein simply as "slice relocation process") relocates slices among storage tiers in order to improve I/O performance, decrease system runtime cost and reduce disk drive wear. However, the process of slice relocation consumes system resources such as CPU, memory, cache space, and bandwidth of a backend storage device. Thus, it may be desirable to efficiently relocate slices of a storage system.

Generally, an Auto-Tiering policy engine (PE) attempts to efficiently utilize high storage tiers that actively receives write requests to write new data while maintaining sufficient headroom storage space in each storage tier in order to accommodate slices required for writing the new data and maintain swap storage space required for performing relocation of slices.

In a conventional system, an Auto-Tiering policy engine (PE) using conventional techniques, maintains fixed sized headroom storage space in each storage tier which indicates free storage space in a storage tier which is not used by the slice relocation process but reserved for accommodating storage space required for writing new data. For example, in such a conventional system, 10% of storage space of a storage tier may be reserved as headroom storage space such that rest of the storage space which is 90% of the storage tier may be utilized for allocating storage required for performing relocation of slices. Generally, a write I/O request writes data associated with the write I/O request to a slice of a hot storage tier of a storage pool. Further, a write I/O request to write new data allocates a slice in a hot tier because the new data associated with the write I/O request is considered hot data by a storage system as the new data is actively modified and written to by a user. However, a slice of a hot storage tier that includes new data may be relocated to a cold storage tier when the new data becomes cold. In such a conventional system, if a storage pool receives a large number of write I/Os resulting into allocation of storage space or provisioning requests for provisioning new LUNs in high storage tiers, a hot storage tier of the storage pool may not include sufficient free storage space for accommodating every write I/O request thereby may allocate storage space for writing new data in a low storage tier. Further, in such a conventional system, a large number of slices may be allocated for writing new data in a storage pool if either the storage pool has been initially created or a storage efficiency feature such as deduplication and/or compression has been enabled for the storage pool. Further, in such a conventional system, when a storage pool reaches a stable state indicating that the storage pool either receives none or a very few write requests resulting in allocation of storage space in the storage pool, the fixed sized headroom storage space (e.g., 10%) is left underutilized as free storage space represented by the fixed sized headroom storage space is neither used for allocating slices for writing new data nor used for relocating slices. Thus, a goal is to be able to efficiently utilize storage space of a storage pool and relocate warm and/or hot data to higher storage tiers. Further, when data is either moved from a hot storage tier to a cold storage tier or from the cold storage tier to the hot storage tier, each storage tier requires storage space for allocating destination slices such that contents of a slice which is in a process of relocation may be copied to a destination slice. Further, in such a conventional system, fixed sized storage space reserved in a storage tier as headroom storage space cannot be changed dynamically and is not configurable by a user. Further, in such a conventional system, a user may not be able to configure headroom storage space for a storage tier as it requires complex understanding of how storage objects are organized.

By contrast, in at least some implementations in accordance with the technique as described herein, the current technique evaluates a rate at which slices are allocated for writing data associated with write I/O requests and based on the rate, dynamically adjusts headroom storage space for each storage tier before relocating slices. Thus, in at least one embodiment of the current technique, for example, if entire storage space of a storage tier has been allocated between the time at which a previous iteration of relocation ends and the time at which a next iteration of relocation starts, an Auto-Tiering policy engine adjusts headroom storage space by reserving additional storage space in the storage tier for accommodating writing new data before starting the next iteration of relocation. Similarly, in at least one embodiment of the current technique, if a small amount of storage space of a storage tier has been allocated between the time at which a previous iteration of relocation ends and the time at which a next iteration of relocation starts, an Auto-Tiering policy engine adjusts headroom storage space before starting the next iteration of relocation by reserving less storage space in the storage tier for writing new data and attempts to use as much storage space of the storage tier as possible for relocating slices.

In at least some implementations in accordance with the current technique as described herein, the use of the managing storage space of storage tiers technique can provide one or more of the following advantages: lowering storage costs by improving efficiency of the data storage system, improving I/O performance of a slice relocation process by efficiently utilizing storage space of each storage tier of a storage pool, and improving overall performance of a storage system by enabling the storage system to efficiently utilize storage space of a storage tier for slice relocation while maintaining sufficient storage space for accommodating new write I/O requests.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

Given the different performance characteristics, one or more tiers of storage devices may be defined. The physical devices may be partitioned into tiers based on the performance characteristics of the devices; grouping similar performing devices together. An embodiment using the techniques herein may define a hierarchy of multiple tiers. Conversely, the particular performance characteristics may be applied to a storage pool with or without the definition of tiers. The set of resources associated with or designated for use by a tier or grouping within a pool may be characterized as a dynamic binding in that the particular set of data storage system resources utilized by consumers in a tier may vary from time to time. A current configuration for the data storage system, static aspects of the current data storage system resources (e.g., types of devices, device storage capacity and physical device characteristics related to speed and time to access data stored on the device), and current workload and other dynamic aspects (e.g., actual observed performance and utilization metrics) of the data storage system may vary at different points in time.

Figure 2A:
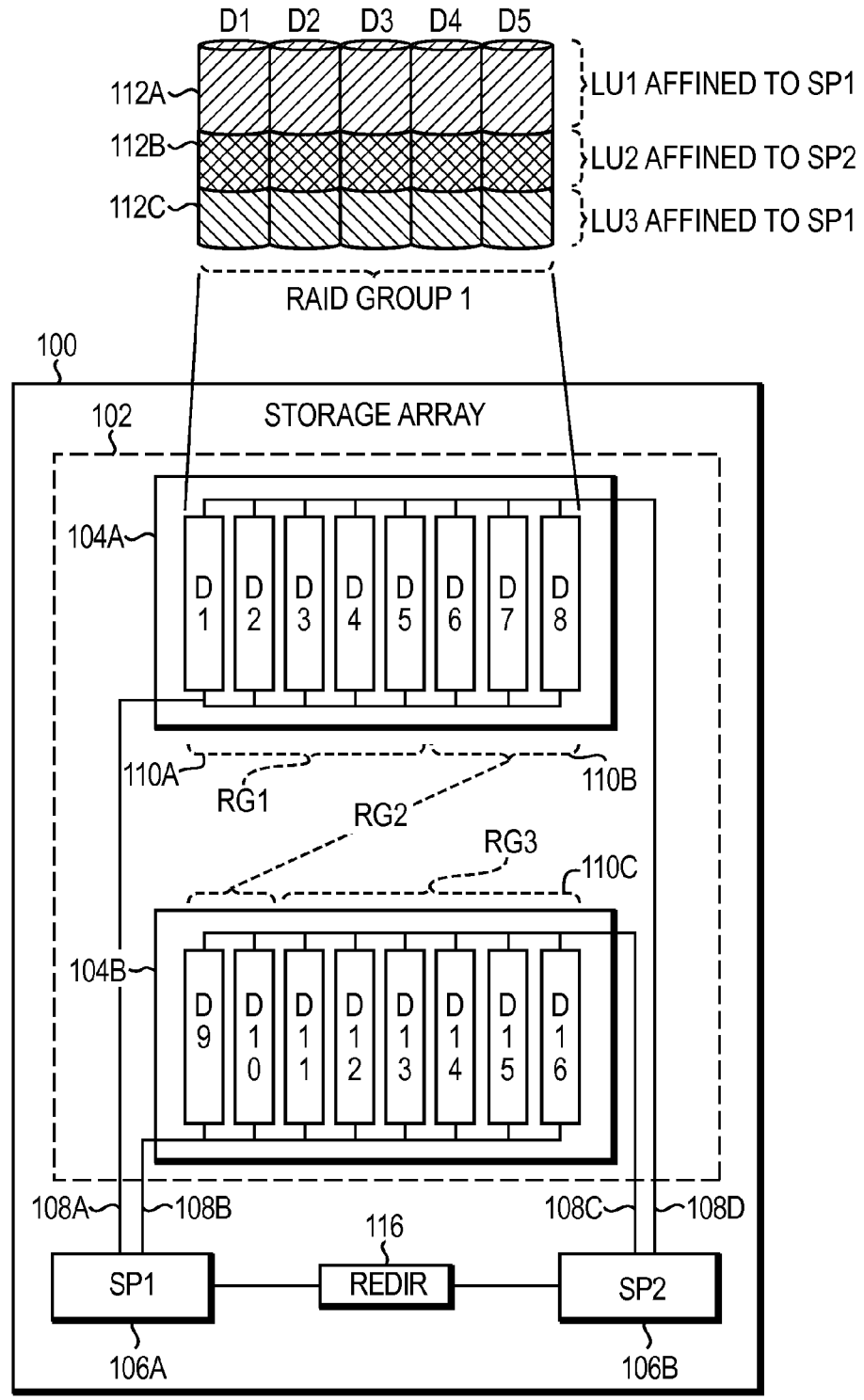
FIGS. 2A and 2B are an example of an embodiment of a computer system that may utilize the techniques described herein.
Figure 2B:
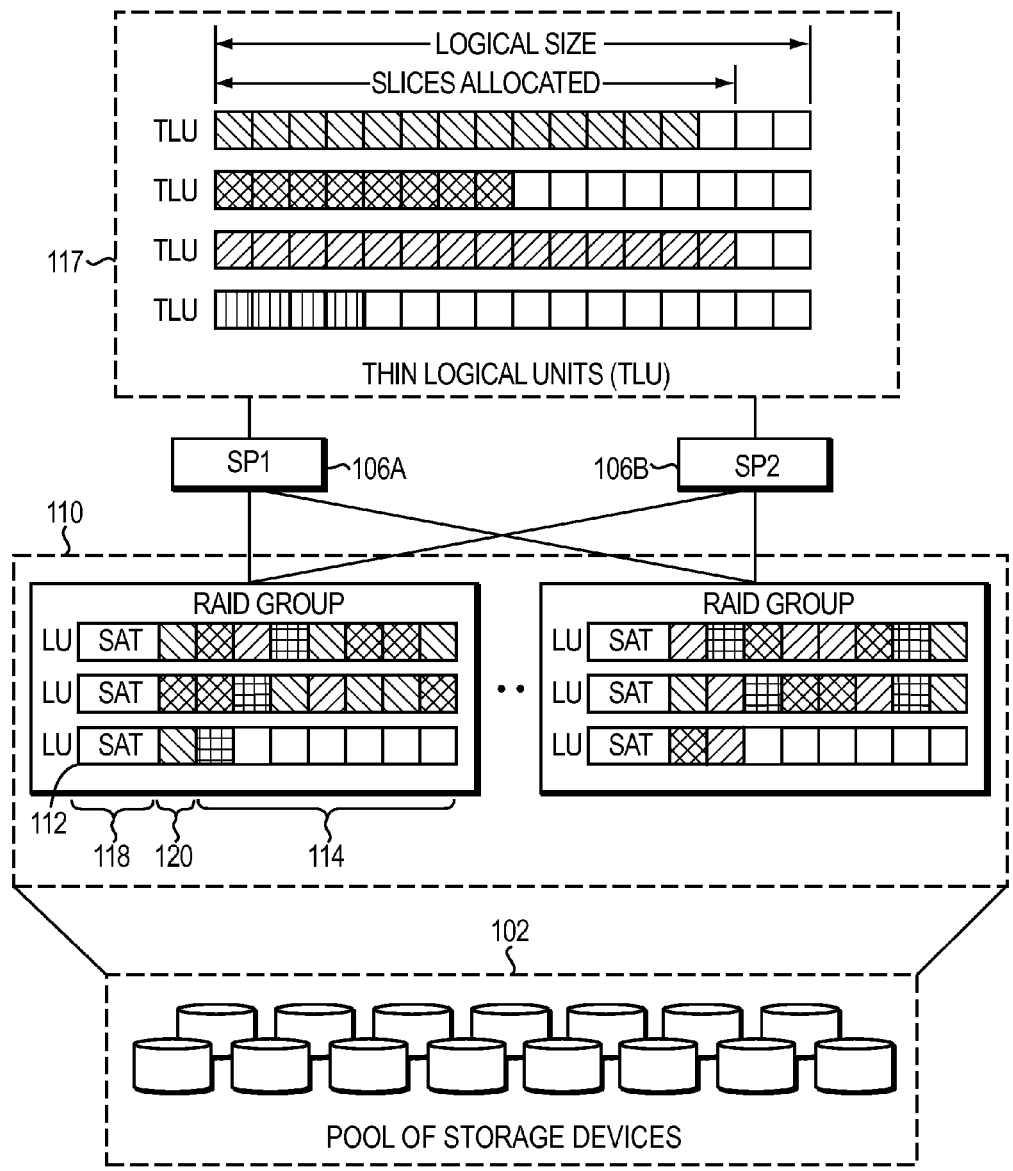

Referring to FIGS. 2A and 2B, shown are examples of an embodiment of a computer system that may be used in connection with performing the techniques described herein. FIG. 2A shows a storage system that comprises a storage array 12. Storage array 12 includes multiple storage devices 102, which are typically hard disk drives, but which may be tape drives, flash memory, flash drives, other solid state drives, or some combination of the above. Storage devices 102 may have various differences in capabilities based on physical characteristics of underlying storage media, e.g., flash memory may be extremely fast compared to tape storage which may be relatively large and cheap. As used herein, storage media may also be referred to as physical media. Storage media may include any of various computer readable media, e.g., hard disks, floppy disks, disks, tapes, discs, solid state memory, optical discs, and flash memory. In at least one embodiment, storage devices 102 may be organized into tiers or classes of storage based on characteristics of associated storage media. For example, flash-based storage device 102 may be tier 1 storage, hard disk-based storage device 102 may be tier 2 storage, and tape-based storage devices 102 may be tier 3 storage.

In at least one embodiment, the storage devices may be organized into multiple shelves 104, each shelf containing multiple devices 102. In the embodiment illustrated in FIG. 2A, storage array 12 includes two shelves, Shelf1 104A and Shelf2 104B; Shelf1 104A contains eight storage devices, D1-D8, and Shelf2 also contains eight storage devices, D9-D16. Storage array 12 may include one or more storage processors 106, for handling input/output (I/O) requests and allocations. Each storage processor 106 may communicate with storage devices 102 through one or more data buses 108. In at least one embodiment, storage array 12 contains two storage processors, SP1 106A, and SP2 106B, and each storage processor 106 has a dedicated data bus 108 for each shelf 104. For example, SP1 106A is connected to each storage device 102 on Shelf1 104A via a first data bus 108A and to each storage device 102 on Shelf2 104B via a second data bus 108B. SP2 106 is connected to each storage device 102 on Shelf1 104A via a third data bus 108C and to each storage device 102 on Shelf2 104B via a fourth data bus 108D. In this manner, each device 102 is configured to be connected to two separate data buses 108, one to each storage processor 106. For example, storage devices D1-D8 may be connected to data buses 108A and 108C, while storage devices D9-D16 may be connected to data buses 108B and 108D. Thus, each device 102 is connected via some data bus to both SP1 106A and SP2 106B. The configuration of storage array 12, as illustrated in FIG. 2A, is for illustrative purposes only, and is not considered a limitation of the current technique described herein.

In addition to the physical configuration, storage devices 102 may also be logically configured. For example, multiple storage devices 102 may be organized into redundant array of inexpensive disks (RAID) groups, or RGs 110, shown in FIG. 1A as RG1 110A, RG2 110B, and RG3 110C. Storage devices D1-D5 are organized into a first RAID group, RG1 110A, while storage devices D6-D10 are organized into a second RAID group, RG2 110B. Storage devices D11-D16 are organized into a third RAID group, RG3 110C. In at least one embodiment, a RAID group may span multiple shelves and/or multiple buses. For example, RG2 110B includes storage devices from both Shelf1 104A and Shelf2 104B.

Although RAID groups are composed of multiple storage devices, a RAID group may be conceptually treated as if it were a single storage device. As used herein, the term "storage entity" may refer to either a single storage device or a RAID group operating as a single storage device. RAID groups (RG) may be created or based on a various factors, including proximity of storage devices, utilization goals, capacity needs, physical characteristics of storage devices 102, and other factors. In at least one embodiment, RGs are based on tiers generally determined by physical characteristics of storage devices (e.g., fast, high quality devices D1-D5 may be tier 1 storage devices, and, as such, may be organized into a given RG 110). Such physical characteristics of storage devices for determining tiers may include but is not limited to capacity of storage device, access speed of storage device (e.g., revolution per minute (RPM) for disk-based media and throughput for solid state media), and type of storage device (e.g., flash, hard disk, and floppy). Further a RAID group may also include storage devices (e.g., disk drives) that are configured from different storage tiers.

In at least one embodiment, storage entities are associated with tiers or classes of storage. Storage entities may be further sub-divided into logical units. A single RAID group or individual storage device may contain one or more logical units. Each logical unit may be further subdivided into portions of a logical unit, referred to as "slices". As used herein, storage area refers to storage space of one or more storage entities in a storage system. Slices may be any size and may be associated with storage media from one or more storage entities. In at least one embodiment, slices are constant-sized portions of storage associated with one storage device 102, or a storage media therein, in storage array 12 (e.g., a 1 gigabyte (GB) slice from D2). In the embodiment illustrated in FIG. 2A, RG1, which includes storage devices D1-D5, is sub-divided into 3 logical units, LU1 112A, LU2 112B, and LU3 112C. Each LU is sub-divided into multiple slices. Further, a user may not access LUs (LU1 112A, LU2 112B, and LU3 112C) as the LUs are referred to as private LUs. However, a user may access a mapped LU which is created from slices of private LUs as described below herein. A mapped LU may also be referred to as a front end logical unit such that a user may allocate the mapped LU for provisioning storage.

FIG. 2B is a block diagram illustrating another view of a data storage system for managing metadata placement in a storage system according to an embodiment of the current technique described herein. In the simplified view shown in FIG. 2B, a pool of storage devices 102 are organized into multiple RAID groups 110, and each RAID group is further divided into a number of LUs from which slices 114 are allocated to one or more mapped LUs for use by users of storage array 12. As used herein, a mapped LU refers to a logical portion of storage space that represent contiguous and/or non-contiguous physical storage space, where mapping allows for physical storage space to be dynamically linked together at a time of use into a logically contiguous address space. Exemplary examples of mapped LUs may include thin logical units (TLUs). A thin logical unit ("TLU") is a sparsely populated logical unit (LU) provisioned at creation but which is not allocated any storage until the storage is actually needed. TLUs 117 may have a logical size that is larger than the actual storage size consumed by TLUs 117. The actual consumed size is determined by the number of slices actually allocated to the TLU 117. Thus, an amount of storage space presented to a host of a data storage system using a thin logical volume may be different than the amount of storage space actually allocated to the thin logical volume. The slices that are allocated to a mapped LUN may be physically located anywhere in storage array 100. As will be discussed in more detail below, these slices may be located more or less contiguously, but they may also be distributed more or less evenly across all physical resources, depending on the slice selection and allocation policy or algorithm. Other physical distributions are within the scope of the current technique claimed herein.

In at least one embodiment, storage processors 106A, 106B are responsible for allocating storage and maintaining information about how that allocated storage is being used. In one implementation of storage array 100, each logical unit 112 is associated with a slice allocation table (SAT) 118, which is used to record information about each slice 114, such as the TLU that is using the slice 114 and whether the slice is free or allocated. The SAT 118 may be stored in the logical unit 112, or it may be stored outside the logical unit 112 to which it is associated.

Figure 3:
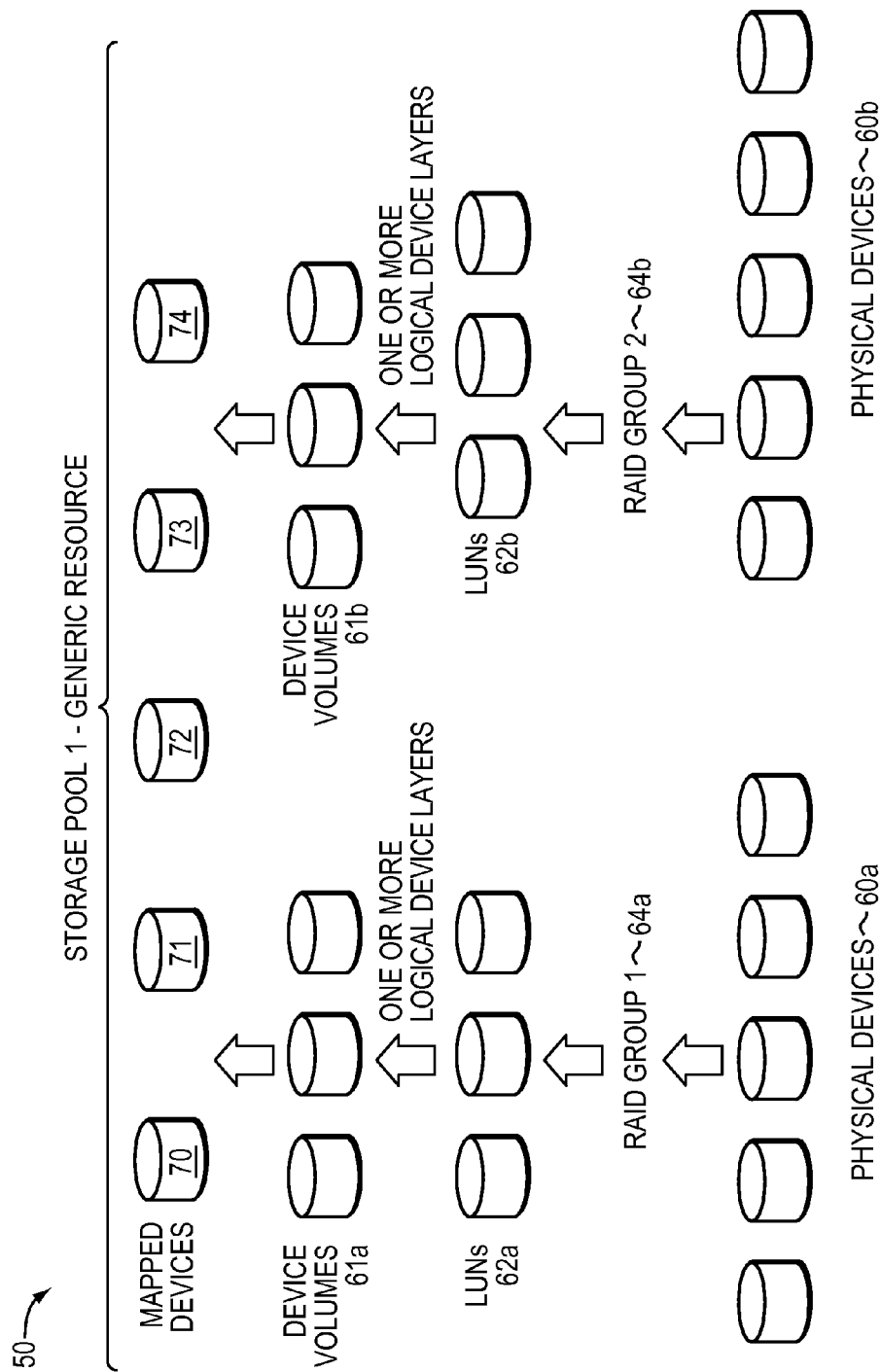
FIG. 3 is an example illustrating storage device layout.

Referring to FIG. 3, shown is an example representing how data storage system best practices may be used to form storage pools. The example 50 illustrates how storage pools may be constructed from groups of physical devices. For example, RAID Group1 64a, 64b may be formed from physical devices 60a. The data storage system best practices of a policy may specify the particular disks and configuration for the type of storage pool being formed. For example, for physical devices 60a on a first data storage system type when forming a storage pool, RAID-5 may be used in a 4+1 configuration (e.g., 4 data drives and 1 parity drive). The RAID Group 1 64a may provide a number of data storage LUNs 62a, 62b. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used for form a storage pool in an embodiment using RAID techniques.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space.

Figure 4A:
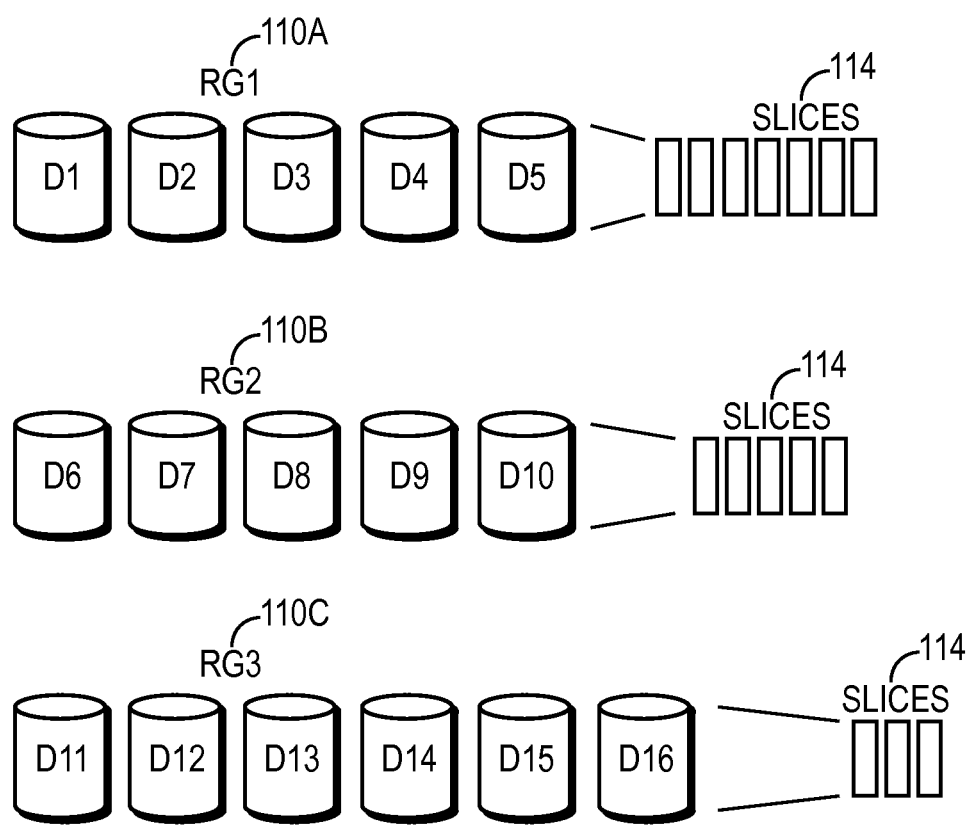
FIGS. 4A and 4B are examples illustrating storage device layout.

Referring to FIG. 4A, shown is a diagram illustrating an exemplary logical division of a storage of a data storage system into storage objects (such as RAID groups) for managing data relocation in the data storage system that may be included in an embodiment using the techniques described herein. With reference also to FIGS. 2A and 2B, for example, storage entities 102 may refer to either a single storage device or a RAID group operating as a single storage device, may be further sub-divided into logical units. A single RAID group or individual storage device may contain one or more logical units (LUs) 112. However, RAID groups need not correspond to LUs and RAID groupings may be further divided into two or more LUs. In addition to RAID groups, each logical unit 112 may be further subdivided into portions of a logical unit, referred to as "slices" 114. Slices 114 may be allocated, de-allocated, re-allocated, reserved, or redistributed by a slice manger. A slice may be, for example, a 1 GB slice of data. However, it should be noted that a slice may be any other size as well, such as 256 megabytes (MB). Further, the techniques described herein should not be construed as being limited to only slices of data; the techniques are equally applicable to other data chunk sizes, such as blocks, slivers (subset of slices), page, file or the like. The slice manager may be a software application or layer that is executed, at least in part, by one or more SPs 106. The slice manager may be responsible for implementing a slice allocation policy and/or algorithm. For example, the slice manager may receive slice allocation requests, and maintain relevant statistical information regarding slices.

Figure 4B:
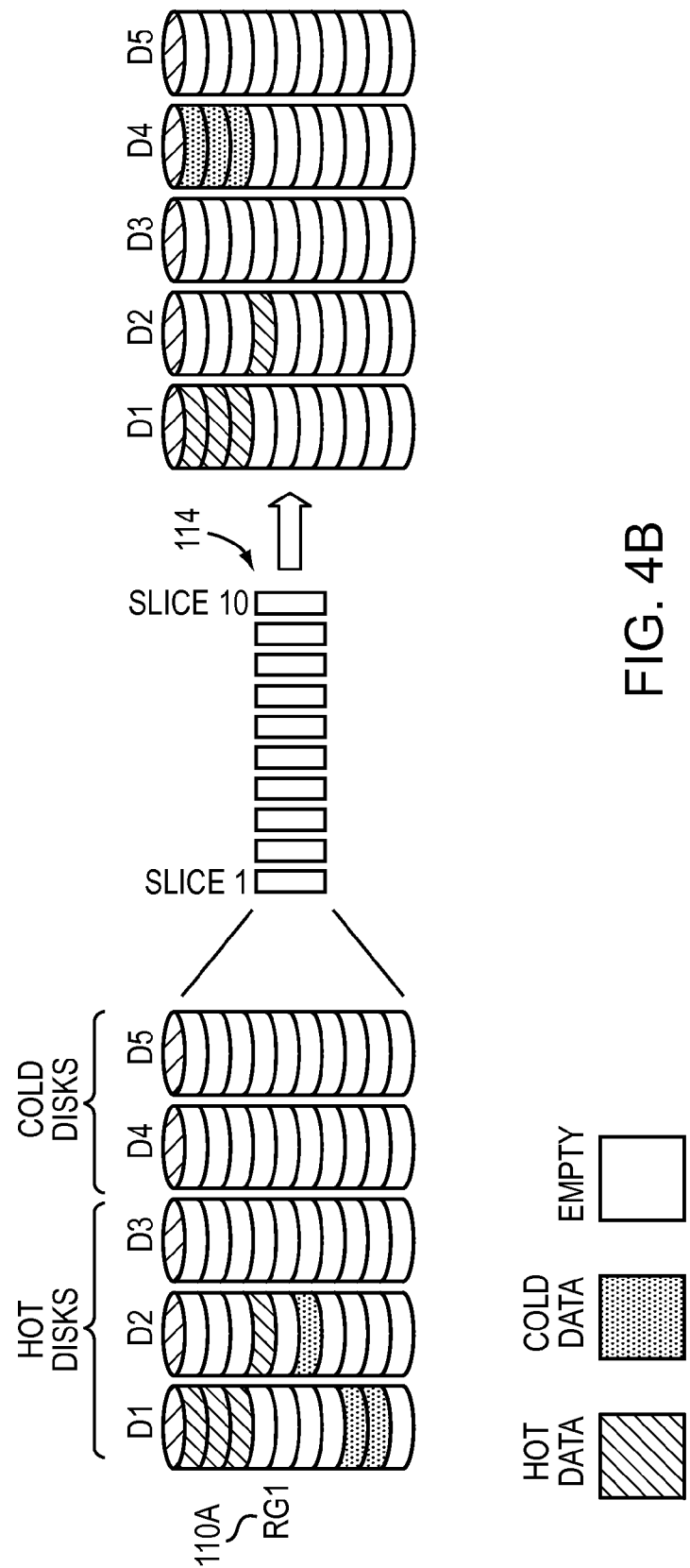

Referring to FIG. 4B, shown is a diagram illustrating another example of logical division of a storage of a data storage system into storage objects (such as RAID groups, storage devices, slices) for managing data relocation in the data storage system that may be included in an embodiment using the techniques described herein. In at least one embodiment, a collection of hard disk drives may be organized into RAID arrays. The collective data storage capacity of storage devices (e.g., RG1 110A) is represented by data storage space. The data storage space may be divided into portions, hereinafter referred to as slices 114 (e.g., SLICE1-SLICE10). In at least one embodiment of the current technique, for example, each slice 114 is approximately 1 gigabyte (GB) in size, but other sizes may be used. Slices 114 within the data storage space may be organized into logical units (LUs), which are commonly referred to as LUNs.

In at least one embodiment of the current technique, data storage systems that comprise storage devices of varied performance characteristics grouped into tiers can be managed in such a way as to migrate data from one portion of the storage pool to another portion of the storage pool. A particular embodiment may help achieve this migration by automatically migrating data among the tiers based on the "temperature" of contents of a slice and location of the slice on storage devices. In general, temperature may correspond to, for example, how often and how recently the data is accessed. For example, hot data may refer to data that has been accessed recently and is accessed often, cold data may refer to data that has not been accessed recently and is not accessed often. Data temperature may be further segmented to include a warm data category that may include data that is less hot than hot data and/or less cold than cold data. Further, the temperature of a slice may be further adjusted based on the type of the slice indicating whether the slice stores data or metadata. Hence, warm data may refer to data that is accessed more often than cold data and less often that hot data. In general, in accordance with an embodiment of the current technique, hot data is migrated to faster (and typically more expensive) storage, and cold data is migrated to slower (and typically less expensive) storage. Warm data may be migrated to either type of storage and such storage may be configurable to be placed in a reduced power consumption state. Migration maybe accomplished by copying the data and changing the map entries for the logical addressed that were involved to reflect the new logical to physical association. Thus, hot data may be stored in disk drives indicated as hot disks and cold data may be stored in disk drives indicated as cold disks.

Additional details regarding slice relocation and tiered data storage arrays are disclosed in U.S. patent application Ser. No. 12/826,434, filed on Jun. 29, 2010 and entitled, "MANAGING MULTI-TIERED STORAGE POOL PROVISIONING" and U.S. patent application Ser. No. 12/824,816, filed on Jun. 28, 2010 and entitled, "METHODS, SYSTEMS, AND COMPUTER READABLE MEDIUM FOR TIER-BASED DATA STORAGE RESOURCE ALLOCATION AND DATA RELOCATION IN A DATA STORAGE ARRAY" which are incorporated by reference herein in their entireties.

Figure 5:
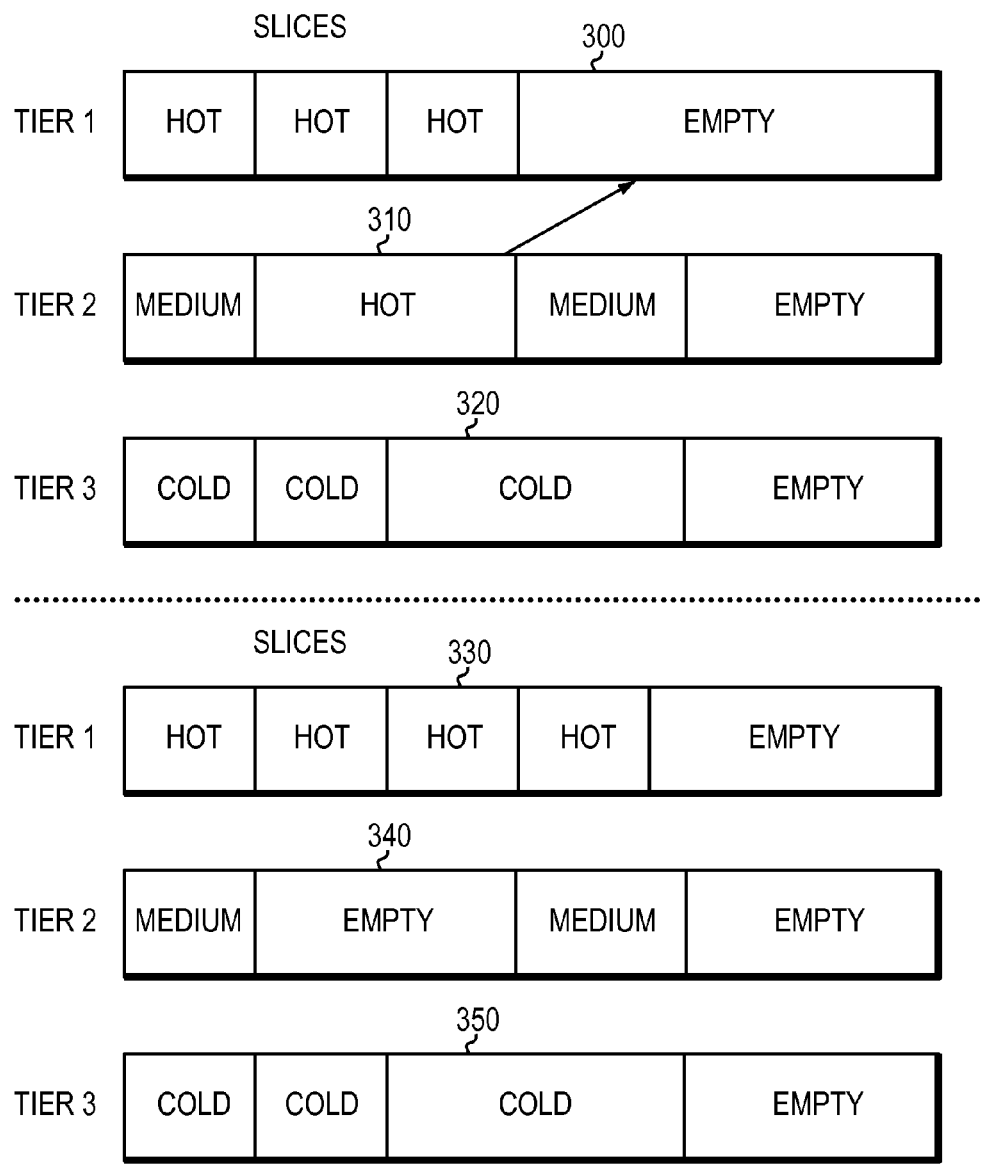
FIGS. 5-7 are block diagrams illustrating in more detail components that may be used in connection with techniques herein.

Referring now to FIG. 5 that illustrates a process of relocating slices from a first storage tier of a storage pool to a second storage tier of the storage pool in a data storage system. In this figure, there are three storage tiers, Tier 1, Tier 2 and Tier 3. Each storage tier includes slices, such as slices 300, 310, and 320. As well, each slice has a temperature associated with it such as hot, cold, or medium. As well, some of the storage tier is also considered empty. Referring to the upper portion of the FIG. 5, there is a hot slice 310 in storage Tier 2. The temperature of a slice may be designated as a scalar or step value that is it may have a numerical equivalent such as 30 degrees or may simply be designated into a bucket, such as cold.

Also shown in the FIG. 5 is that Tier 1 has empty space 300. In this example, Tier 1 may have faster performance characteristics and a higher cost. Conversely, Tier 2 may have slower performance characteristics but a lower cost. This may be seen, for example, in the fact that there is more storage in Tier 2 than there is in Tier 1. Again, in the upper portion of the FIG. 5, it is shown that there is a hot slice 310 in Tier 2 that should be moved to Tier 1. In this example embodiment, as shown in the lower portion of FIG. 5, the hot slice is moved to Tier 1 330 leaving an empty space 340 in Tier 2 while Tier 3 350 remains same.

Figure 6:
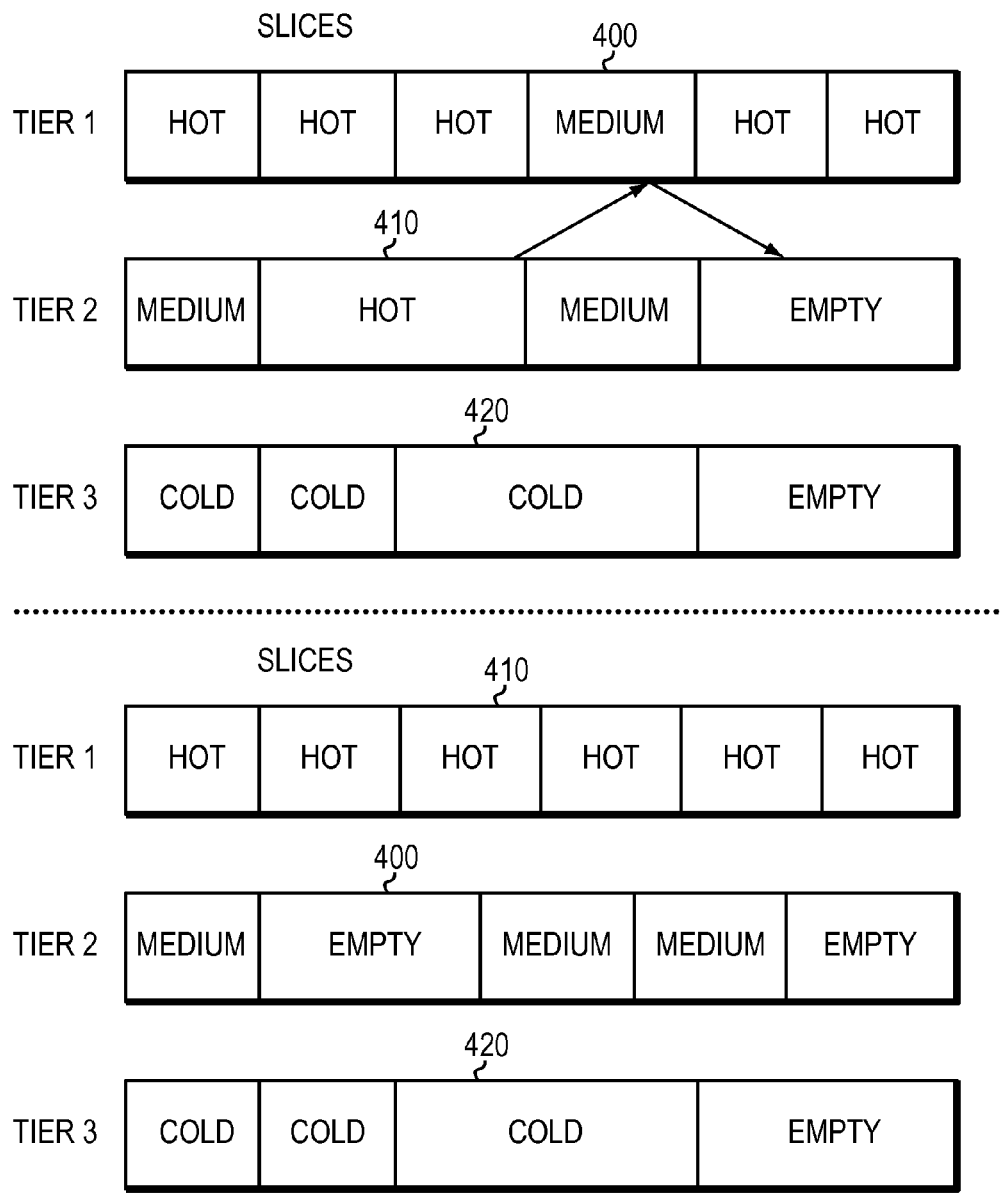

Referring now to FIG. 6 that illustrates a process of relocating slices from a first storage tier of a storage pool to a second storage tier of the storage pool in a data storage system. In this embodiment, there is a hot slice 410 in Tier 2, a medium slice 400 in Tier 1, and cold slices in Tier 3 420; however, Tier 1 has no space to accommodate an additional tier. Therefore, in this embodiment, the medium slice 400 on Tier 1 is migrated to Tier 2 and the hot slice 410 in Tier 2 is migrated to Tier 1. Note, that it was the need to migrate the hot slice 410 to Tier 1 that caused the medium slice 400 to be shifted to Tier 2. In this example, it may have been more effective to have the medium slice located in Tier 1. Also note that slices may change temperature based on data access request. Therefore, a slice's temperature may rise or fall over time. The slice's temperature may be the result of any number of calculations based on data access or data write requests to that slice.

Figure 7:
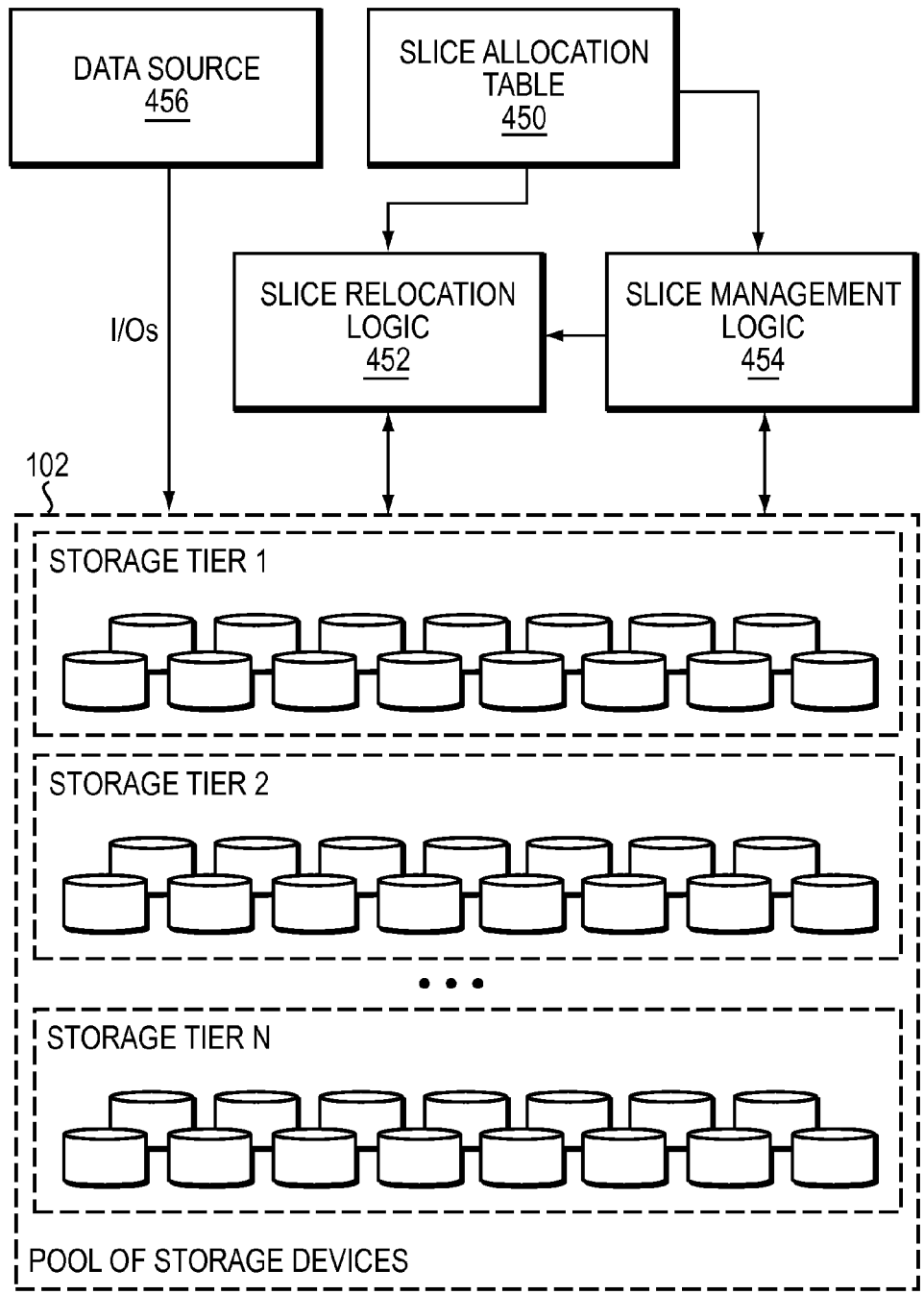

Referring to FIG. 7, shown is a more detailed representation of components that may be included in an embodiment using the techniques described herein. In at least some embodiments of the current technique, a storage pool may include one or more RAID groups. A RAID group may be associated with data devices, such as the physical devices 60a-60b discussed herein, so that, for example, there is one or more data devices for each RAID group, any portion of a data device for any portion of the pools of storage, and/or any combinations thereof. Further, data devices associated with a storage pool may have different characteristics, such as speed, cost, reliability, availability, security and/or other characteristics. Further, storage pool 102 may include one or more storage tiers such that each storage tier has different performance characteristics.

In at least one embodiment of the current technique, slice relocation logic 452 may shift hot slices of a logical volume to upper tiers and cold slices of the logical volume down to lower tiers. The goal of the slice relocation process is to put hot, frequently accessed slices to higher tiers and maximize the utilization of these high tiers, which include faster but more expensive drives such as a flash storage drives. Slice relocation logic 452 relocates a slice based on the temperature of the slice. The temperature of a slice is determined based on I/O activity directed to the slice. I/O activity of a slice is an indicator of current I/O load of the slice. Slice I/O activity is computed using raw slice statistics. The computation may be done in any of several different ways. The specific computation to use may depend on the system I/O traffic pattern. In at least some cases, the simplest and most straightforward calculation is to use total slice I/O counts as I/O activity, such that the slice I/O load is the moving average of slice I/O counts. Further, slice relocation logic 452 works in conjunction with slice allocation table 450 for relocating data from a set of slices to another portion of the storage pool.

In at least one embodiment of the current technique, data source 456 sends I/O requests that may result in writing new data to storage pool 102 which requires slices to be allocated from an appropriate storage tier within the storage pool 102. Further, a storage tier from which slices are allocated for writing new data may also need to provide storage space for relocating a set of slices from another storage tier to the storage tier. Thus, in at least one embodiment of the current technique, in order to accommodate storage space for writing new data and relocation of slices, slice management logic 454 (also referred to herein as "Auto-Tiering policy engine" or "slice relocation process") evaluates storage utilization characteristics such as history of slice relocation and the rate at which I/O requests resulting into writing new data are received. Based on the evaluation, slice management logic 454 adjust headroom storage space reserved in each storage tier of storage pool 102 such that the headroom storage space reserved in each storage tier helps data storage system 12 to accommodate write I/O requests to write new data and relocate slices in the storage tier.

Further, in at least one embodiment of the current technique, maximum and minimum threshold values may be defined for headroom storage space reserved in a storage tier such that slice management logic 454 adjusts the value of the headroom storage space for a storage tier within the range indicated by the maximum and minimum threshold values.

In at least one embodiment of the current technique, space utilization characteristics of a storage tier are evaluated before starting the process of relocating a set of slices. Based on the evaluation of space utilization characteristics, headroom storage space of the storage tier is adjusted and the process of relocating the set of slices is started after adjusting the headroom storage space such that storage space of the storage tier may efficiently be utilized for accommodating requests to write new data and relocate the set of slices. In at least one embodiment of the current technique, for example, if no or a few new requests are received for writing new data in a storage tier, a small amount of headroom storage space is reserved such that most of the storage space of the storage tier may be utilized for relocating slices. Similarly, in at least one embodiment of the current technique, for example, if a large number of new requests are received for writing new data in a storage tier, a large amount of headroom storage space is reserved such that the storage tier includes sufficient storage space for allocating slices for writing the new data. Further, headroom storage space of a storage tier is adjusted automatically based on the allocating write workload indicating the amount of storage space allocated by write requests.

Further, in at least one embodiment of the current technique, headroom storage space reserved in a storage tier may be defined as a percentage value such that, for example, 20% headroom storage space reserved in a storage tier indicates that slice relocation logic 452 can use 80% of the total storage space of the storage tier for relocating slices and 20% of the total storage space of the storage tier is reserved as free storage space for accommodating requests for writing new data. Thus, in such an example, if the total storage capacity of a storage tier is 100 gigabytes (GB), 20% headroom storage space indicates that the slice relocation process can use up to 80 gigabytes (GB) of storage space of the storage tier for relocating slices.

Thus, in at least one embodiment of the current technique, the process of reserving headroom storage space in a storage tier is improved dynamically by adjusting the headroom storage space between maximum and minimum threshold values which may be configured by a user and/or a storage system. Typically, the process of relocating a set of slices is performed repeatedly either at a specific time interval or based on a specific criterion. Slice management logic 454 evaluates storage space utilization of each storage tier every time the slice relocation process starts relocating a set of slices. Based on the evaluation of the storage space utilization of each storage tier, slice management logic 454 determines the rate at which slices have been allocated in each storage tier since the last time the slice relocation process has relocated a set of slices. If, for example, a storage tier reaches storage space utilization of 100%, headroom storage space reserved for the storage tier is incremented by a specific value each time the slice relocation process relocates a set of slices until the headroom storage space reaches a maximum threshold value configured for the storage tier. Similarly, if, for example, a current storage space utilization of a storage tier is less than a previous storage space utilization value that existed at the time the slice relocation process last relocated a set of slices, headroom storage space for the storage tier is decremented by a specific value each time the slice relocation process relocates a set of slices until the headroom storage space reaches a minimum threshold value configured for the storage tier. By adjusting headroom storage space of a storage tier based on the range indicated by maximum and minimum threshold values ensures that a storage tier may include sufficient storage space for accommodating storage space required for writing new data and storage space required for relocating slices each time the slice relocation process relocates slices. Further, the slice relocation process may be triggered when a storage pool reaches storage space utilization of one hundred percent. For example, if storage space utilization of a storage tier is 60% during a previous iteration of the slice relocation process and a current storage space utilization changes to 40%, current headroom storage space reservation of 20% may be decremented to accommodate additional slices that may be needed for relocating a set of slices.

In at least one embodiment of the current technique, slice relocation statistics and slice allocation rate are determined before the slice relocation process starts an iteration that relocates a set of slices. Further, the rate at which slices are allocated may be determined based on storage space utilization of a storage tier and by comparing previous and current storage space utilizations where the previous storage space utilization indicates the amount of storage space that has been allocated during a previous iteration of the slice relocation process and the current storage space utilization indicates the amount of storage space that has been allocated during a current iteration of the slice relocation process. Further, metadata of each slice of a storage tier may be evaluated to determine whether each slice of the storage tier has been allocated for writing new data. Thus, based on the evaluation of metadata, storage space utilization of a storage tier may be determined. Further, the rate at which slices are allocated indicates the number of slices that has been allocated for writing new data during a specific period of time.

Further, it should be noted that headroom storage space reserved for a storage tier may be adjusted dynamically and automatically based on a policy. Further, a threshold value may also be used for triggering a change in headroom storage space reserved for a storage tier.

Figure 8:
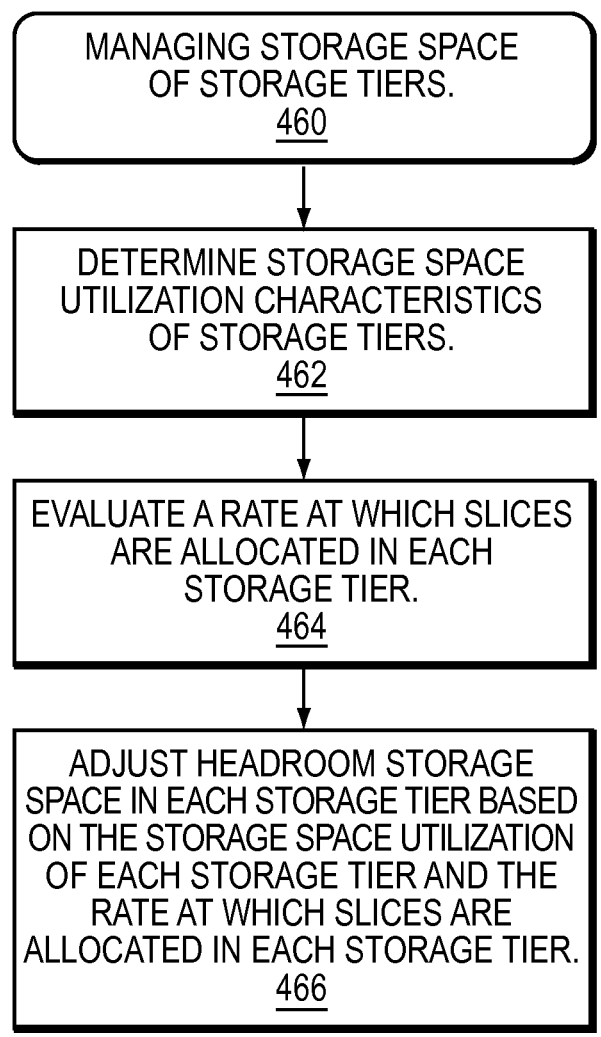
FIG. 8 is a flow diagram illustrating processes that may be used in connection with techniques herein.

Referring to FIG. 8, shown is a more detailed flow diagram illustrating managing storage space of storage tiers in storage systems. With reference also to FIG. 7, a data storage system manages storage space of storage tiers of a storage pool (step 460). Storage space utilization characteristics of each storage tier of the storage pool are determined (step 462). A rate at which slices are allocated for writing new data in each storage tier is determined (step 464). Headroom storage space in each storage tier is adjusted based on the rate at which slices are allocated and the storage space utilization characteristics (step 466).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing storage space of storage tiers, the method comprising:

evaluating storage space utilization characteristics of a storage tier of a set of storage tiers in a storage system prior to starting a next iteration of relocation of a set of slices from a first storage tier to a second storage tier included in the set of storage tiers, wherein the storage space utilization characteristics of the storage tier includes a rate at which storage space has been allocated for writing data in the storage tier since a last iteration of relocation of a set of slices, wherein a slice is a logical representation of a subset of physical disk storage, wherein the storage system includes a processor; and based on the evaluation, dynamically adjusting reservation of headroom storage space in each storage tier of the set of storage tiers prior to starting the next iteration of relocation of the set of slices, wherein headroom storage space in a storage tier is decreased upon determining that a current storage space utilization of the storage tier is less than a previous storage space utilization of the storage tier and headroom storage space in a storage tier is increased upon determining that a current storage space utilization of the storage tier is more than a previous storage space utilization of the storage tier, wherein the current storage space utilization of a storage tier indicates an amount of storage space of the storage tier that has been allocated during a current iteration of relocation of slices, wherein the previous storage space utilization of a storage tier indicates an amount of storage space of the storage tier that has been allocated during a previous iteration of relocation of slices, wherein the headroom storage space indicates a portion of the total amount of storage space of the storage tier that has been reserved as unused storage space in the storage tier, wherein the portion of the total amount of storage space reserved as the headroom storage space is adjusted based on minimum and maximum threshold values, wherein the headroom storage space reserved in a storage tier of the set of storage tiers enables the storage tier to accommodate allocation of storage space required for relocating slices into the storage tier and writing new data in the storage tier by a write I/O request.

2. The method of claim 1, wherein the rate at which the storage space has been allocated in the storage tier is determined by comparing a current storage space utilization value with a previous storage space utilization value.

3. The method of claim 1, wherein the storage space utilization characteristics of a storage tier includes information regarding a rate at which slices are allocated in the storage tier.

4. The method of claim 1, wherein the headroom storage space for a storage tier is adjusted based on a policy.

5. The method of claim 1, wherein the evaluation of the storage space utilization characteristics of the storage tier is performed before starting a slice relocation process.

6. The method of claim 1, wherein an auto-tiering policy engine identifies a set of storage objects in a storage tier of a storage pool for relocation.

7. The method of claim 1, wherein the storage object includes a slice, wherein the slice is a logical representation of a subset of physical disk storage.

8. The method of claim 1, wherein a storage tier includes a disk drive system comprising a plurality of Redundant Array of Inexpensive Disks (RAID) systems, each RAID system of the plurality of RAID systems having a first disk drive and a second disk drive.

9. A system for use in managing storage space of storage tiers, the system comprising a processor configured to:
evaluate storage space utilization characteristics of a storage tier of a set of storage tiers in a storage system prior to starting a next iteration of relocation of a set of slices from a first storage tier to a second storage tier included in the set of storage tiers, wherein the storage space utilization characteristics of the storage tier includes a rate at which storage space has been allocated for writing data in the storage tier since a last iteration of relocation of a set of slices, wherein a slice is a logical representation of a subset of physical disk storage, wherein the storage system includes the processor, wherein the set of storage tiers are organized on the storage system; and
dynamically adjust, based on the evaluation, reservation of headroom storage space in each storage tier of the set of storage tiers prior to starting the next iteration of relocation of the set of slices, wherein headroom storage space in a storage tier is decreased upon determining that a current storage space utilization of the storage tier is less than a previous storage space utilization of the storage tier and headroom storage space in a storage tier is increased upon determining that a current storage space utilization of the storage tier is more than a previous storage space utilization of the storage tier, wherein the current storage space utilization of a storage tier indicates an amount of storage space of the storage tier that has been allocated during a current iteration of relocation of slices, wherein the previous storage space utilization of a storage tier indicates an amount of storage space of the storage tier that has been allocated during a previous iteration of relocation of slices, wherein the headroom storage space indicates a portion of the total amount of storage space of the storage tier that has been reserved as unused storage space in the storage tier, wherein the portion of the total amount of storage space reserved as the headroom storage space is adjusted based on minimum and maximum threshold values, wherein the headroom storage space reserved in a storage tier of the set of storage tiers enables the storage tier to accommodate allocation of storage space required for relocating slices into the storage tier and writing new data in the storage tier by a write I/O request.

10. The system of claim 9, wherein the rate at which the storage space has been allocated in the storage tier is determined by comparing a current storage space utilization value with a previous storage space utilization value.

11. The system of claim 9, wherein the storage space utilization characteristics of a storage tier includes information regarding a rate at which slices are allocated in the storage tier.

12. The system of claim 9, wherein the headroom storage space for a storage tier is adjusted based on a policy.

13. The system of claim 9, wherein the evaluation of the storage space utilization characteristics of the storage tier is performed before starting a slice relocation process.

14. The system of claim 9, wherein an auto-tiering policy engine identifies a set of storage objects in a storage tier of a storage pool for relocation.

* * * * *